United States Patent
Huang

(10) Patent No.: US 9,879,651 B2
(45) Date of Patent: Jan. 30, 2018

(54) VANE DEVICE FOR A TURBINE APPARATUS

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 250 days.

(21) Appl. No.: 14/788,444

(22) Filed: Jun. 30, 2015

(65) Prior Publication Data

US 2016/0003218 A1     Jan. 7, 2016

(30) Foreign Application Priority Data

Jul. 2, 2014   (TW) .............................. 103122836 A

(51) Int. Cl.
*F03D 3/06* (2006.01)
*F03D 3/00* (2006.01)

(52) U.S. Cl.
CPC ............. *F03D 3/061* (2013.01); *F03D 3/005* (2013.01); *F05B 2240/216* (2013.01); *F05B 2240/311* (2013.01); *Y02E 10/74* (2013.01)

(58) Field of Classification Search
CPC ........................... F03D 3/061; F05B 2240/216
USPC .......................................... 416/197 A, 197 R
See application file for complete search history.

(56) References Cited

U.S. PATENT DOCUMENTS

| | | | | |
|---|---|---|---|---|
| 2,094,603 A | * | 10/1937 | Keene | ..................... F03D 3/068 416/111 |
| 5,997,252 A | * | 12/1999 | Miller | ..................... F03D 3/005 416/132 B |
| 6,948,905 B2 | * | 9/2005 | Horjus | ..................... F03D 3/02 415/4.2 |
| 2008/0106102 A1 | * | 5/2008 | Liao | ........................ F03D 3/005 290/55 |
| 2012/0082560 A1 | * | 4/2012 | Firic | ....................... F03D 3/061 416/243 |

* cited by examiner

*Primary Examiner* — Richard Edgar
*Assistant Examiner* — Michael Sehn
(74) *Attorney, Agent, or Firm* — Muncy, Geissler, Olds & Lowe, P.C.

(57) ABSTRACT

A vane device is adapted for use in a turbine apparatus, and includes a rotary shaft and a plurality of angularly spaced-apart vane units. The rotary shaft is rotatable in a rotational direction. The vane units are connected to the rotary shaft. Each of the vane units includes a grid frame and a plurality of spaced-apart cup members. The grid frame is connected to the rotary shaft. The cup members are arranged in an array and are connected to the grid frame. Each of the cup members has an inner surface that defines a receiving space, and an outer surface that is opposite to the inner surface and that faces toward the rotational direction.

6 Claims, 7 Drawing Sheets

US 9,879,651 B2

VANE DEVICE FOR A TURBINE APPARATUS

CROSS-REFERENCE TO RELATED APPLICATION

This application claims priority of Taiwanese Application No. 103122836, filed on Jul. 2, 2014.

FIELD

The disclosure relates to a vane device, and more particularly to a vane device for use in a turbine apparatus.

BACKGROUND

Wind energy is one of the available forms of natural energy that can be converted into electrical energy, and is more environmentally friendly compared with generating electrical energy from fossil-fuel such as petroleum or coal. The shape, outline and number of vanes of a wind turbine machine may affect the effectiveness of conversion from wind energy to electrical energy.

Referring to FIG. 1, a conventional anemometer is shown and includes an upright prop 91, three connection rods 92 rotatably mounted on a top of the upright prop 91, and three cup members 93 respectively connected to the connection rods 92. Each of the cup members 93 has a concave inner surface 931 and a convex outer surface 932 that is opposite to the inner surface 931. When wind flows toward the inner surface 931 of one of the cup members 93, since air flowing over the outer surface 932 has a longer path than that of air flowing over the inner surface 931, difference in wind pressure would result therebetween. The difference in wind pressure propels the cup members 93 to rotate.

However, to convert wind power or water power into sufficient electrical power by adopting the structure of the conventional anemometer as an actuator for a power generator, each of the cup members 93 has to be increased in size. Based on Bernoulli's principle, the wind that passes over the enlarged outer surface 931 must have a relatively high speed for successfully propelling the cup members 93. As a result, use of the structure of the conventional anemometer is limited to locations having strong wind flow or water flow.

SUMMARY

Therefore, an object of the disclosure is to provide a vane device for use in a turbine apparatus that can alleviate the drawback of the prior arts.

According to the disclosure, the vane device is adapted for use in a turbine apparatus and includes a rotary shaft that is rotatable in a rotational direction, and a plurality of angularly spaced-apart vane units.

Each of the vane units includes a grid frame and a plurality of spaced-apart cup members.

The grid frame is connected to the rotary shaft.

The cup members are arranged in an array and are connected to the grid frame. Each of the cup members has an inner surface that defines a receiving space, and an outer surface that is opposite to the inner surface and that faces toward the rotational direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
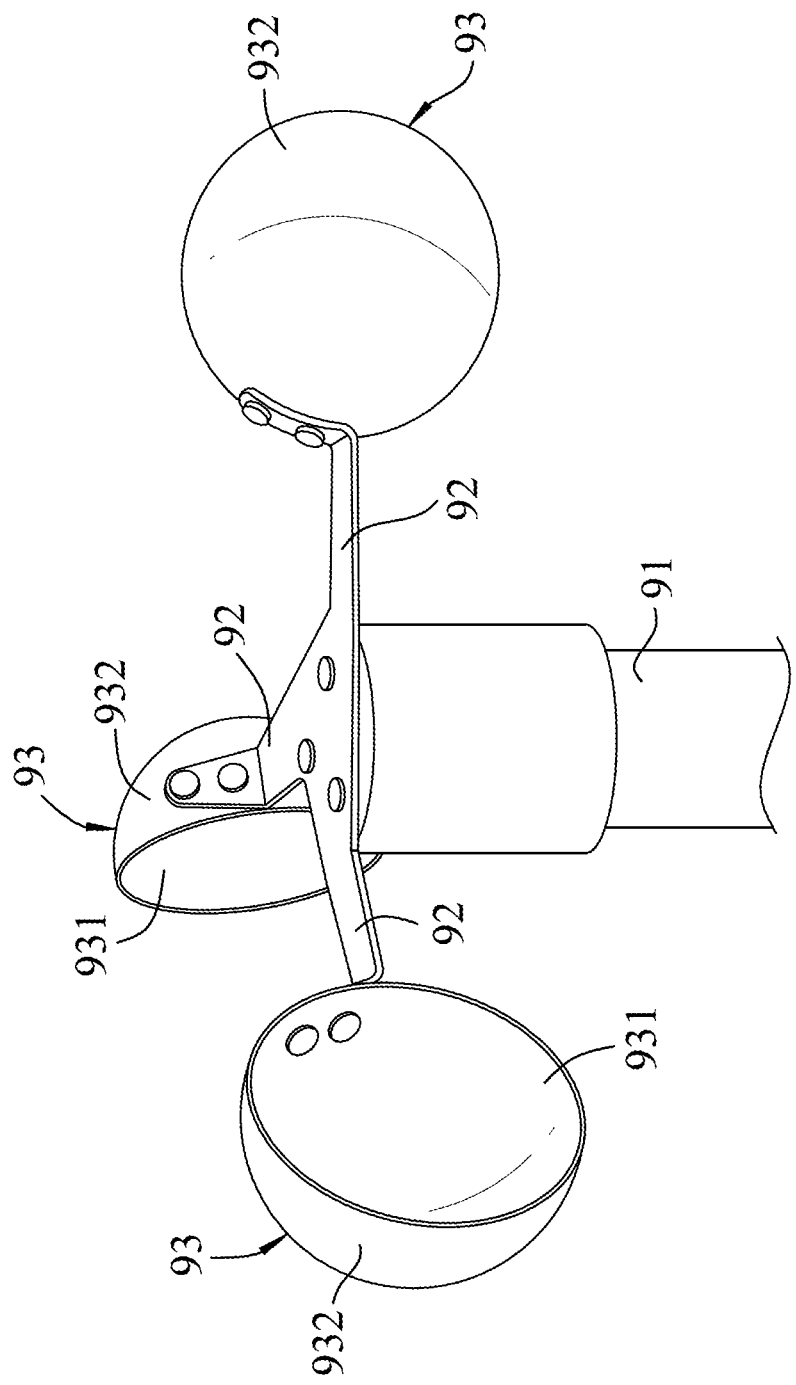
FIG. 1 is a perspective view illustrating a conventional anemometer.

Before the disclosure is described in greater detail, it should be noted that like elements are denoted by the same reference numerals throughout the disclosure.

Figure 2:
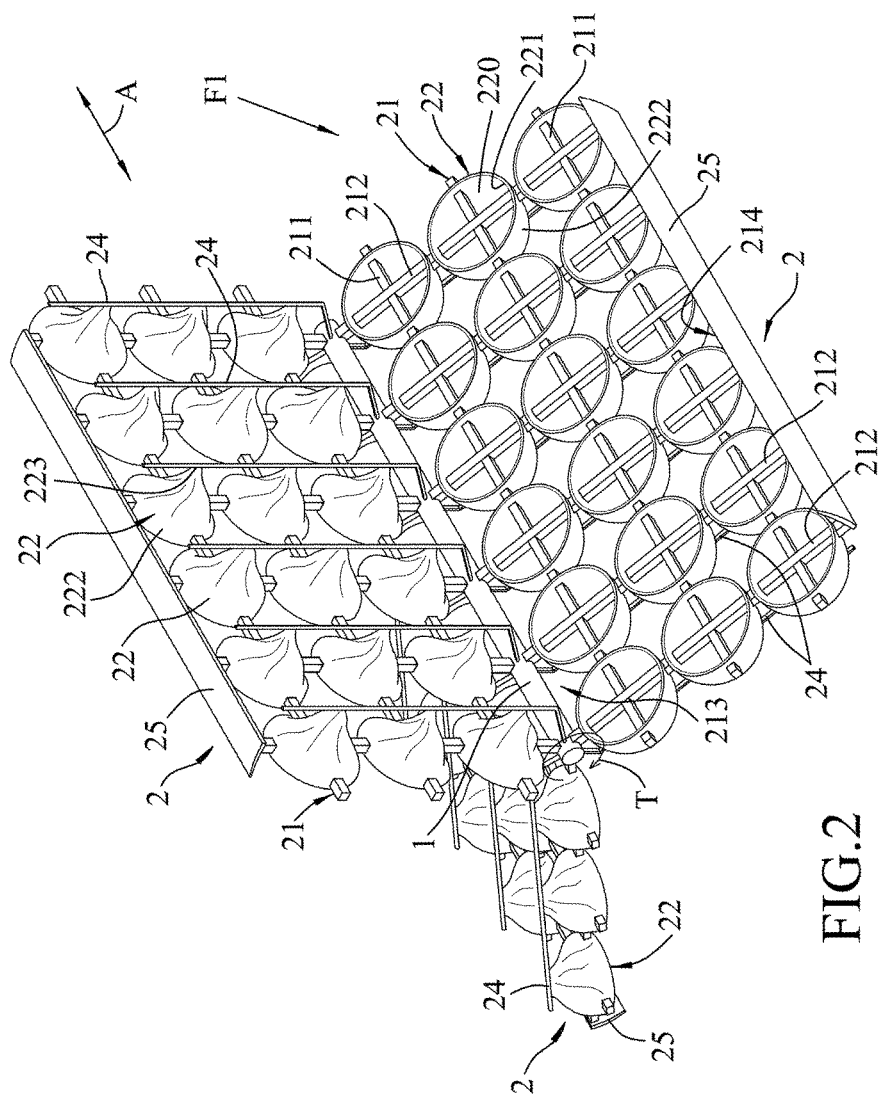
FIG. 2 is a perspective view illustrating operation of a first embodiment of a vane device according to the present disclosure.
Figure 3:
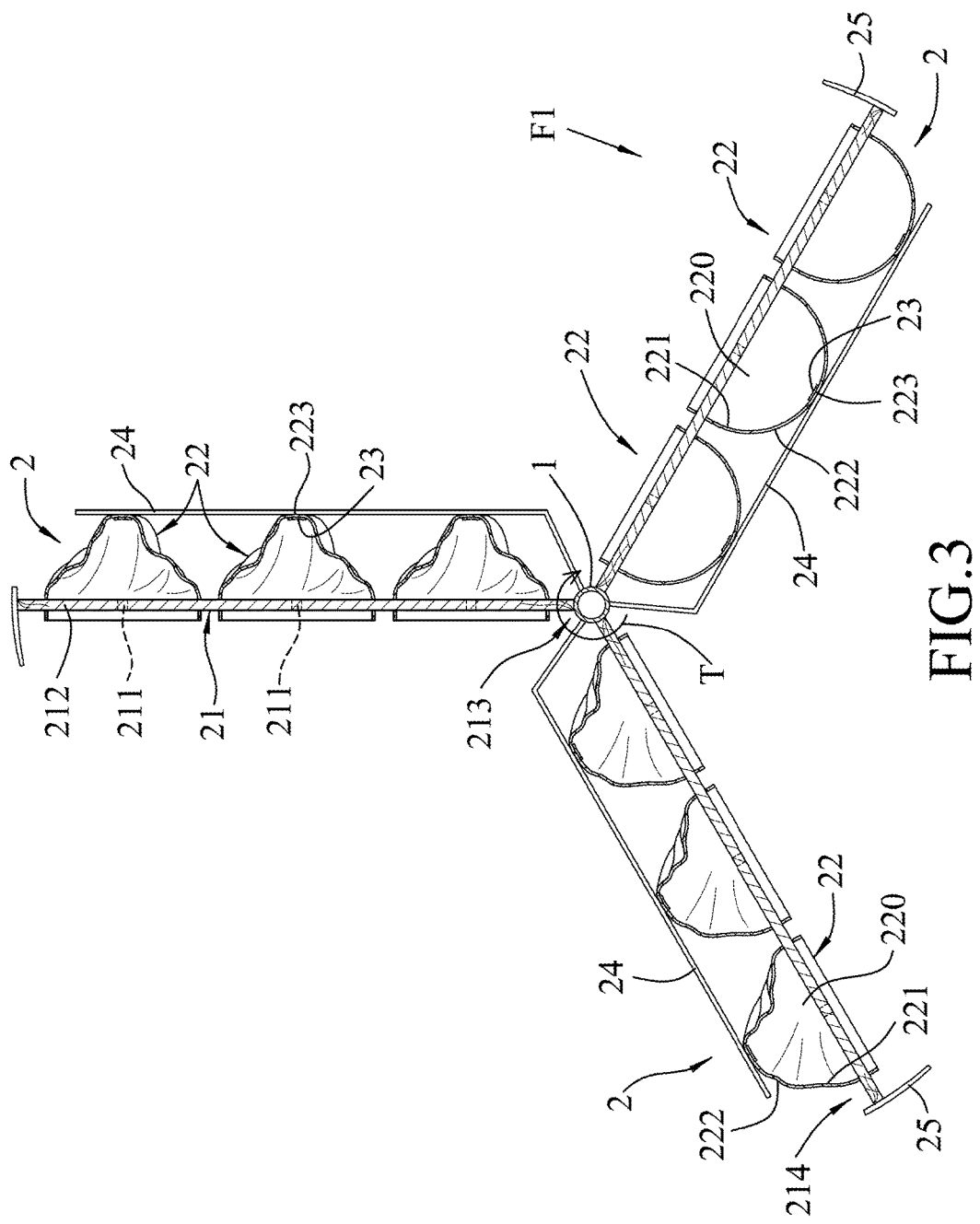
FIG. 3 is a sectional view of the first embodiment.

Referring to FIGS. 2 and 3, the first embodiment of a vane device according to the disclosure is adapted for use in a turbine apparatus. The vane device includes a rotary shaft 1 and three vane units 2.

In this embodiment, the rotary shaft 1 extends in an axial direction (A), which is a horizontal direction, is lifted by a support base (not shown) to be a few meters above the ground, and is rotatable in a rotational direction (T).

The vane units 2 are equiangularly spaced apart from one another and are connected to the rotary shaft 1. Each of the vane units 2 includes a grid frame 21, a plurality of spaced-apart cup members 22, a plurality of reinforcement plates 23, a plurality of reinforcement rods 24, and a block member 25.

The grid frames 21 of the vane units 2 are spaced 120 degrees apart from each other. In each of the vane units 2, the grid frame 21 is connected to the rotary shaft 1, and has a plurality of first rods 211 and a plurality of second rods 212. The first rods 211 extend in the axial direction (A) and are spaced apart from each other in a radial direction transverse to the axial direction (A). The second rods 212 extend in the radial direction and are spaced apart from each other in the axial direction (A). In this embodiment, each of the first rods 211 is horizontal and parallel to the rotary shaft 1. In addition, the grid frame 21 of each of the vane units 2 has an inner side 213 that is connected to the rotary shaft 1 and an outer side 214 that is distal from the rotary shaft 1 in the radial direction and that is opposite to the inner side 213.

In each of the vane units 2, the cup members 22 are arranged in an array and are connected to the grid frame 21. In this embodiment, each of the vane units 2 includes eighteen of the cup members 22. Each of the cup members 22 is positioned at an intersection of a corresponding one of the first rods 211 and a corresponding one of the second rods 212 and fixed thereto by rope knots or adhesive. As shown in FIG. 3, each of the cup members 22 has an inner surface 221 that defines a receiving space 220, and an outer surface 222 that is opposite to the inner surface 221 and that faces toward the rotational direction (T). The outer surface 222 of each of the cup members 22 has an apex 223 at a center thereof.

In this embodiment, each of the cup members 22 is made from one of a cloth, rubber, soft plastic or soft polymer material. When wind flows against the inner surfaces 221 of the cup members 22, each of the cup members 22 is in substantially shell-like hemispherical form. Each of the cup members 22 wrinkles when not blown by the wind. However, it should be noted that the material of each of the cup members 22 is not limited to this disclosure.

In each of the vane units 2, each of the reinforcement plates 23 is disposed on the inner surface 221 of a respective one of the cup members 22 at a position corresponding to the apex 223 of the outer surface 222. The reinforcement plates 23 may be made from one of a cloth, rubber, metal, or fiberglass material so as to reinforce the structural strength of the cup members 22 near the apexes 223.

The reinforcement rods 24 of each of the vane units 2 are connected to the rotary shaft 1, extend in the radial direction, and are spaced apart from each other in the axial direction (A). In this embodiment, the reinforcement rods 24 has a root portion that extends from the rotary shaft 1, and a reinforcement portion bent from the root portion, spaced apart from a respective one of the second rods 212, and interconnecting the apexes 223 of the outer surfaces 222 of the cup members 22 which are positioned on the respective one of the second rods 212. Specifically, each of the vane units 2 has three of the first rods 211, six of the second rods 212, and six of the reinforcement rods 24. Each of the reinforcement rods 24 is in connection with the apexes 223 of the outer surfaces 222 of three of the cup members 22 which are positioned on a respective one of the second rods 212. The reinforcement rods 24 serve to prevent the cup members 22 from being blown to be reversely inflated (i.e., the inner surfaces 221 being convex, and the outer surfaces 222 being concave) when the outer surfaces 222 are against the direction of wind flow.

In this embodiment, the block member 25 of each of the vane units 2 is connected to the outer side 214 of the grid frame 21 and extends in a direction opposite to the rotational direction (T).

In actual use, when the wind force (F1) is applied on the inner surfaces 221 of the cup members 22 of one of the vane units 2, the corresponding cup members 22 are properly inflated with the inner surfaces 221 being concave and the outer surfaces 222 being convex. As such, wind flowing over the outer surfaces 222 of the cup members 22 has a path longer than that when flowing over the inner surfaces 221 of the cup members 22. Based on Bernoulli's principle, wind pressure at the outer surface 222 of each of the cup members 22 is smaller than that at the inner surface 221, such that the cup members 22 are propelled by the wind force (F1) to rotate about an axis of the rotary shaft 1 in the rotational direction (T). In addition, in each of the vane units 2, the cup members 22 are arranged with gaps being formed there among so as to alleviate possible reverse torque and wind drag during rotation of the cup members 22.

In this embodiment, when one of the vane units 2 is not directly acted by the wind force (F1), the corresponding cup members 22 are slightly wrinkled until the one of the vane units 2 is once again directly acted by the wind force (F1).

Further, the block member 25 of each of the vane units 2 can limit the air flow. When the one of the vane units 2 is directly acted by the wind force (F1), the corresponding block member 25 would guide the wind flow toward the inner surfaces 221 (i.e., the upwind surfaces) of the corresponding cup members 22 for propelling the corresponding one of the vane units 2 and enhancing the torque thereof.

In addition, since a torque acted on a spot of one of the vane units 2 is smaller than that acted on a farther spot of the one of the vane units 2 with respect to the rotary shaft 1, the cup members 22 radially farther from the rotary shaft 1 can be designed to be smaller, and the cup members 22 radially closer to the rotary shaft 1 can be designed to be larger. In some embodiments, guiding plates (not shown) may be additionally included to assist with collection and guidance of the air flow of the wind.

To sum up, since multiple cup members 22 are present in each vane unit 2, the cup members 22 can be structurally miniaturized, i.e., the inner and outer surfaces 221, 222 of each of the cup members 22 can be reduced, so that the path of the air flow over the inner and outer surfaces 221, 222 can be shortened, thereby allowing wind passing over the outer surfaces 222 of the cup members 22 to not require high speed to propel the cup members 22 to rotate. As a result, the vane device of this disclosure is suitable for operation by either low-speed wind or high-speed wind. In addition, since each of the cup members 22 is made of a soft material in this embodiment, the vane device of this disclosure is relatively lightweight, easy to rotate, and has a low fabrication cost.

Figure 4:
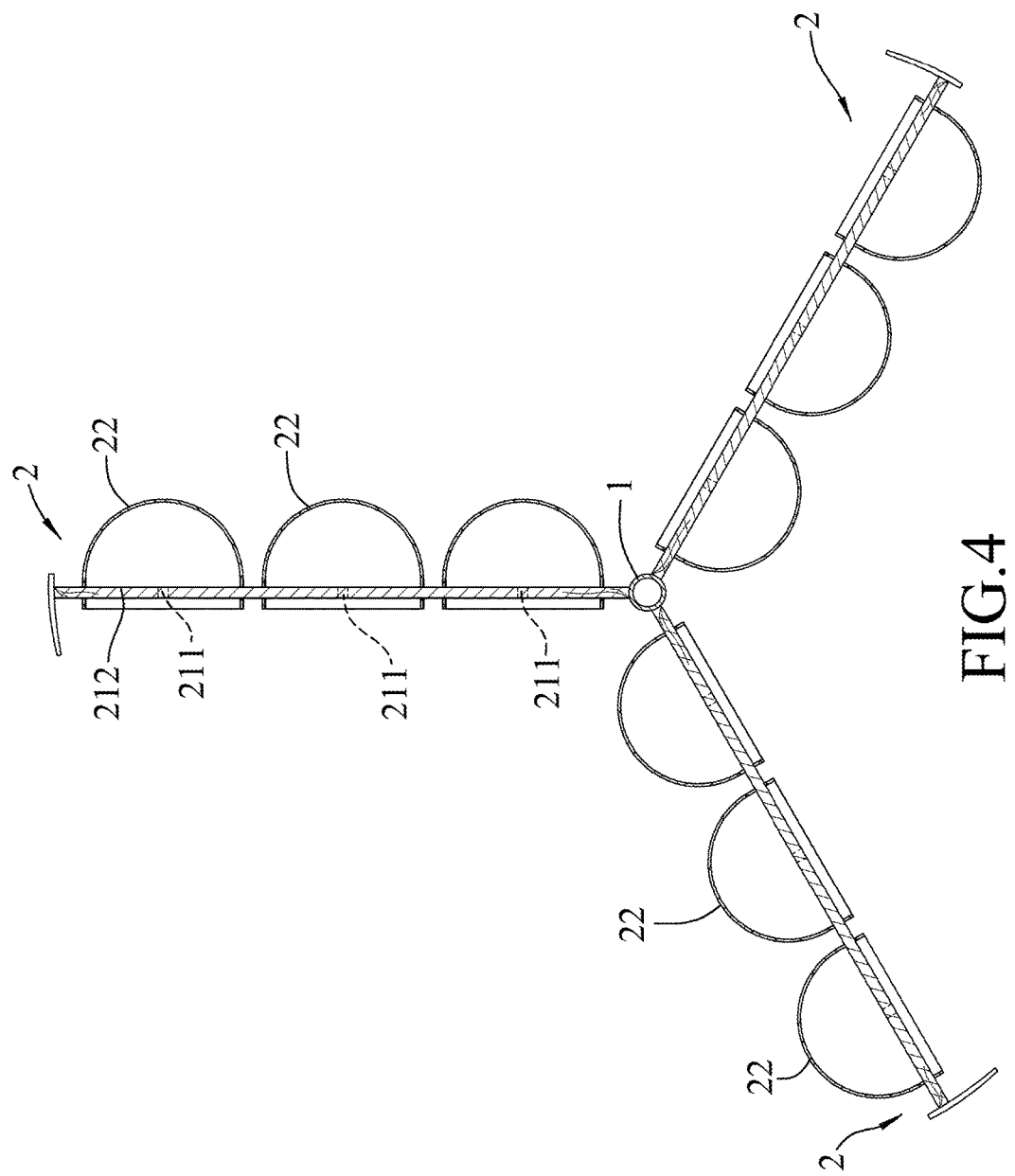
FIG. 4 is a sectional view of a second embodiment of a vane device according to the present disclosure.

FIG. 4 illustrates the second embodiment of a vane device according to the present disclosure, which has a configuration similar to that of the first embodiment. In the second embodiment, each of the cup members 22 is a hard cup which may be made from one of metal, fiberglass, hard plastic or hard polymer material. As such, each of the cup members 22 is permanently held in substantially shell-like hemispherical form. For each of the vane units 2, since each of the cup members 22 has sufficient structural strength, the reinforcement plate 23 and the reinforcement rods 24 which are illustrated in the first embodiment are omitted. The second embodiment can achieve the same effect as that of the first embodiment.

Figure 5:
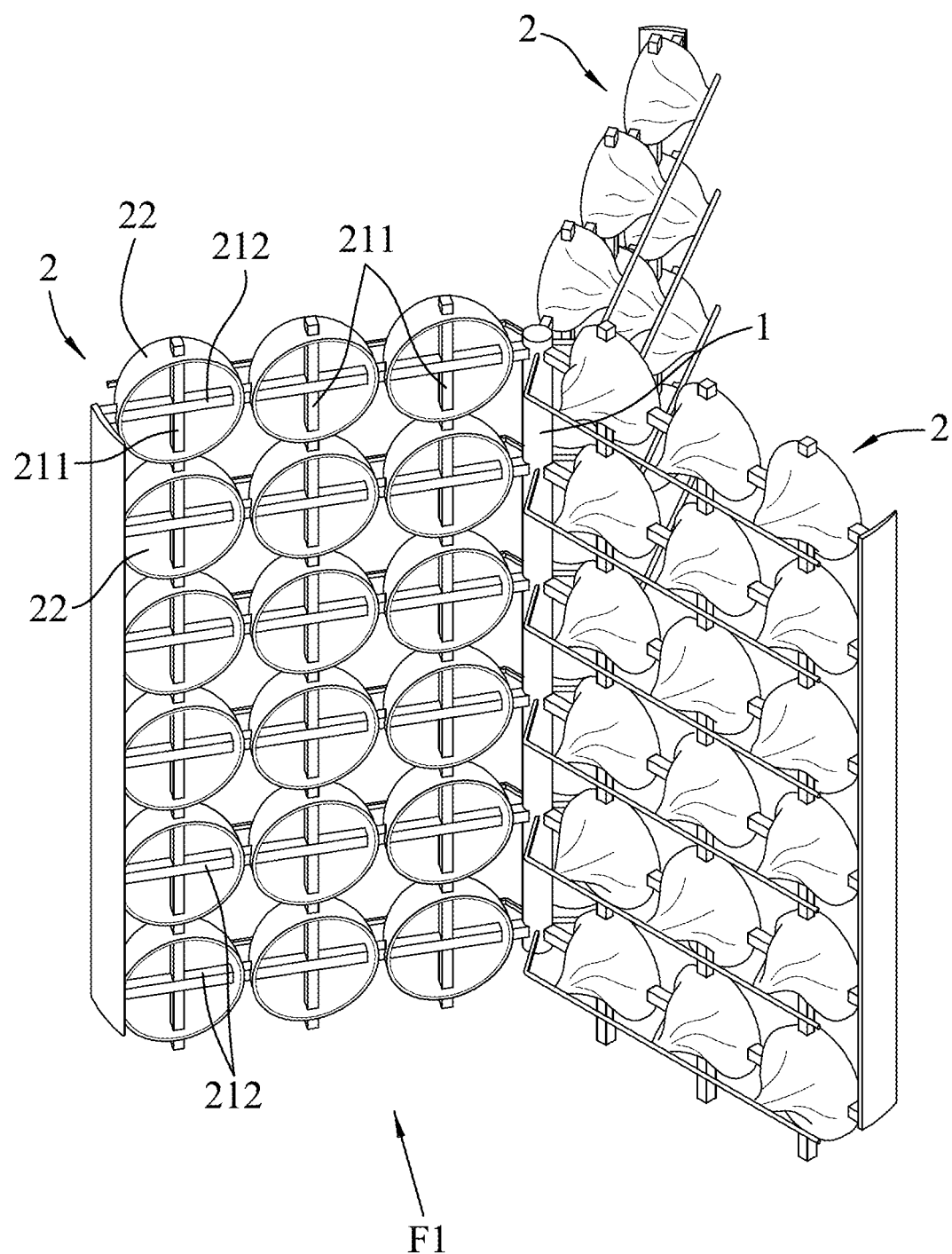
FIG. 5 is a perspective view of a third embodiment of a vane device according to the present disclosure.

FIG. 5 illustrates the third embodiment of a vane device according to the present disclosure, which has a configuration similar to that of the first embodiment. In the third embodiment, the axial direction in which the rotary shaft 1 extends is a vertical direction. In each of the vane units 2, each of the first rods 211 extends vertically and each of the second rods 212 extends horizontally. The third embodiment has the same advantages as those of the first embodiment.

Figure 6:
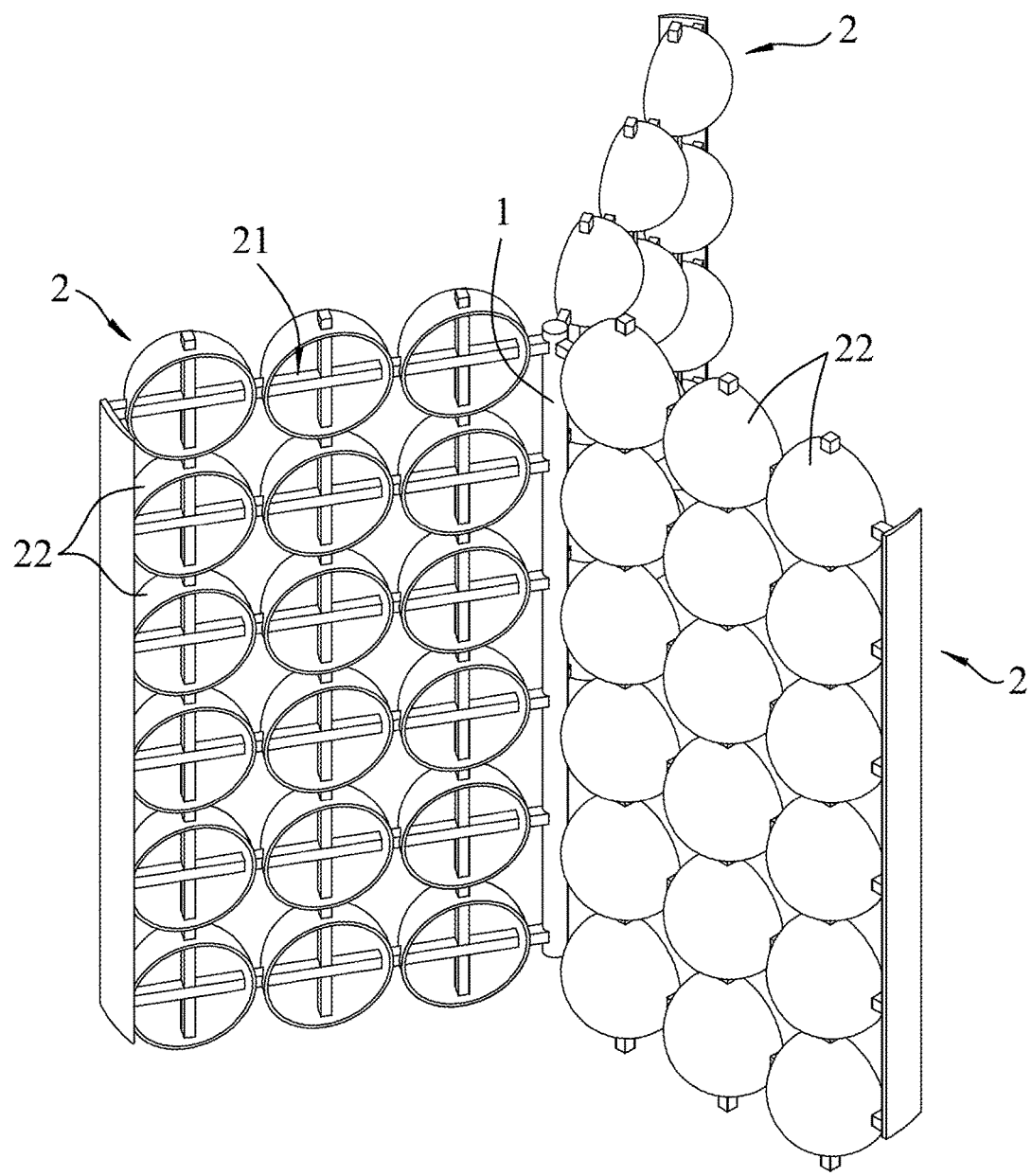
FIG. 6 is a perspective view of a fourth embodiment according to the present disclosure.
Figure 7:
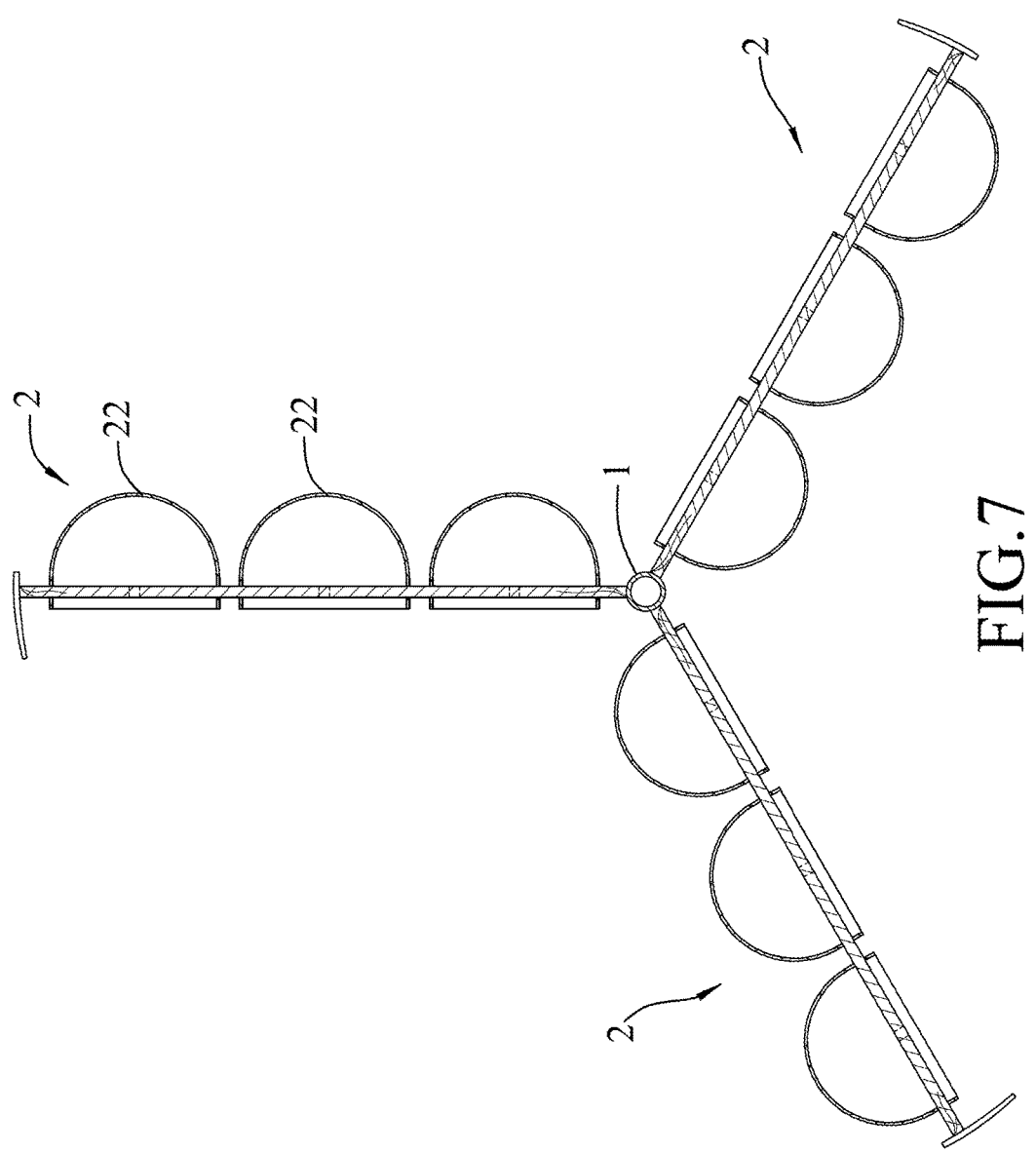
FIG. 7 is a sectional view of the fourth embodiment.

FIGS. 6 and 7 illustrate the fourth embodiment of a vane device according to the present disclosure, which has a configuration similar to that of the third embodiment. In the fourth embodiment, the rotary shaft 1 may extend either horizontally or vertically, and the vane device of this disclosure may be operated by either wind force or water force. Further, each of the cup members 22 is a hard cup which may be made from one of metal, fiberglass, hard plastic, hard polymer material, glass, or ceramics.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vane device adapted for use in a turbine apparatus, comprising:
  a rotary shaft that is rotatable in a rotational direction; and
    a plurality of angularly spaced-apart vane units, each of said vane units including
      a grid frame that is connected to said rotary shaft, and
      a plurality of spaced-apart cup members that are arranged in an array and that are connected to said grid frame, each of said cup members having an inner surface that defines a receiving space, and an outer surface that is opposite to said inner surface and that faces toward the rotational direction;

wherein said rotary shaft extends in an axial direction;

wherein said grid frame of each of said vane units has a plurality of first rods that extend in the axial direction and that are spaced apart from each other in a radial direction transverse to the axial direction, and a plurality of second rods that extend in the radial direction and that are spaced apart from each other in the axial direction, said second rods intersecting said first rods, each of said cup members being positioned in place at an intersection of a corresponding one of said first rods and a corresponding one of said second rods;

wherein each of said cup members is penetrated by the corresponding one of said first rods at two positions that are spaced apart along the axial direction and that are located at two opposite sides of said intersection, and is penetrated by the corresponding one of said second rods at two positions that are spaced apart along the radial direction and that are located at two opposite sides of said intersection.

2. The vane device as claimed in claim 1, wherein:

each of said vane units further has a plurality of reinforcement rods that are connected to said rotary shaft, and that are spaced apart from each other in the axial direction; and said outer surface of each of said cup members has an apex that is connected to a corresponding one of said reinforcement rods.

3. The vane device as claimed in claim 2, wherein each of said vane units further has a plurality of reinforcement plates, each of said reinforcement plates being disposed on said inner surface of a respective one of said cup members at a position corresponding to said apex of said outer surface.

4. The vane device as claimed in claim 1, wherein said rotary shaft extends in a horizontal direction.

5. The vane device as claimed in claim 1, wherein said rotary shaft extends in a vertical direction.

6. The vane device as claimed in claim 1, wherein:

said grid frame of each of said vane units has an inner side that is connected to said rotary shaft and an outer side that is distal from said rotary shaft and that is opposite to said inner side; and each of said vane units further has a block member that is connected to said outer side and that extends in a direction opposite to the rotational direction.

\* \* \* \* \*